Nov. 4, 1941.  W. F. OCENASEK  2,261,696
TILTING SAW
Filed March 15, 1939   4 Sheets-Sheet 1

INVENTOR
William Ferdinand Ocenasek
BY
Albert F. Nathan
ATTORNEY

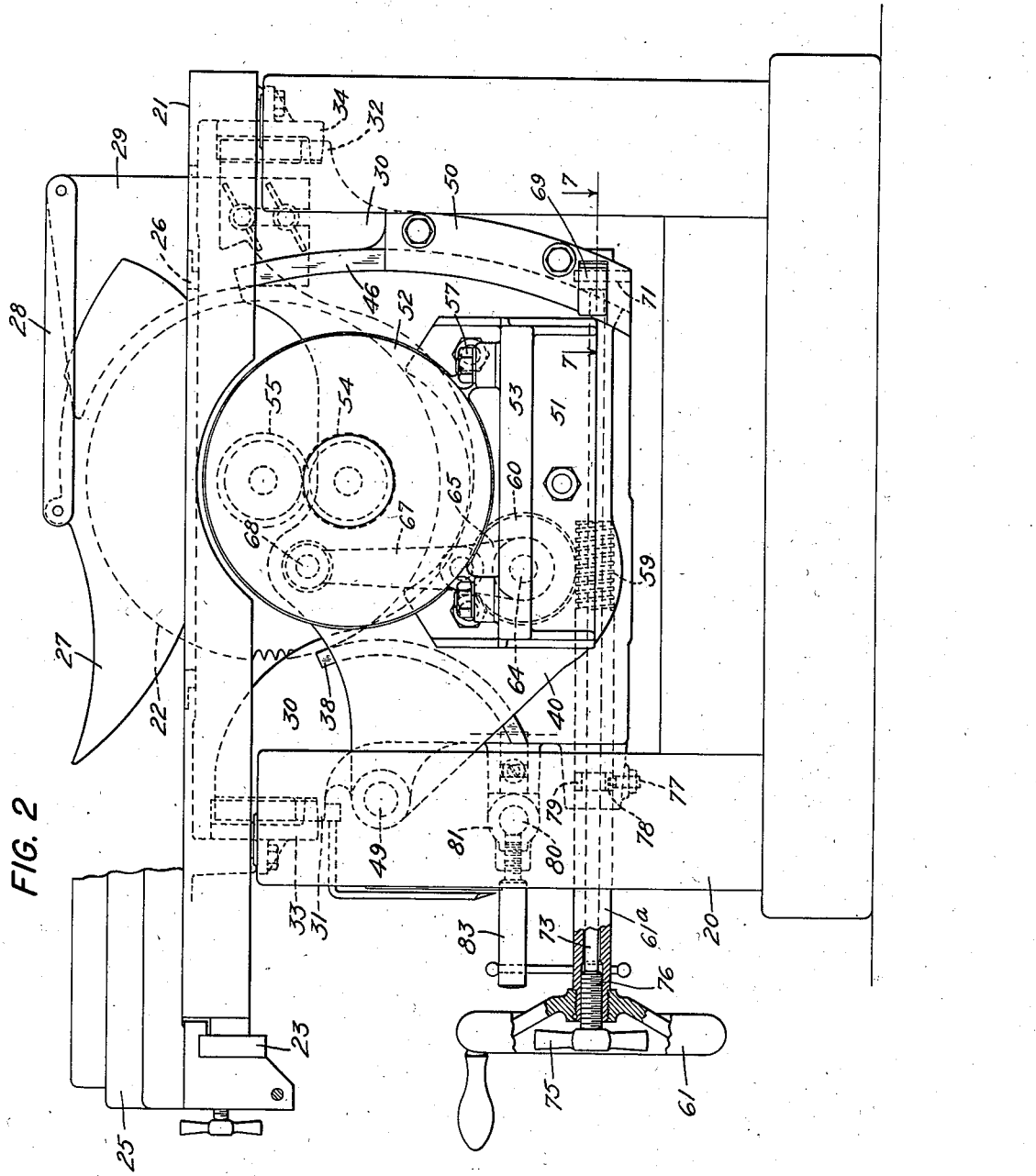

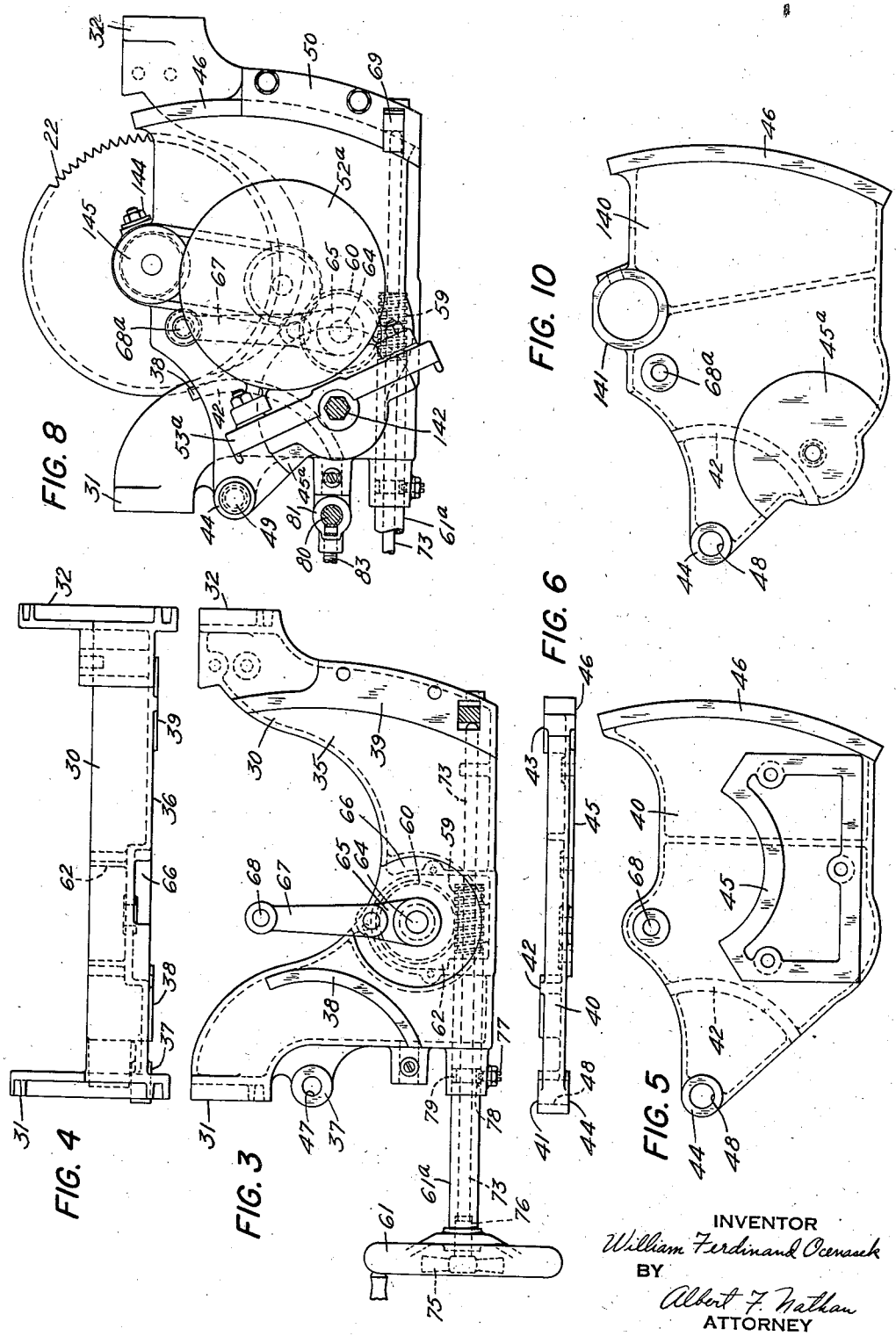

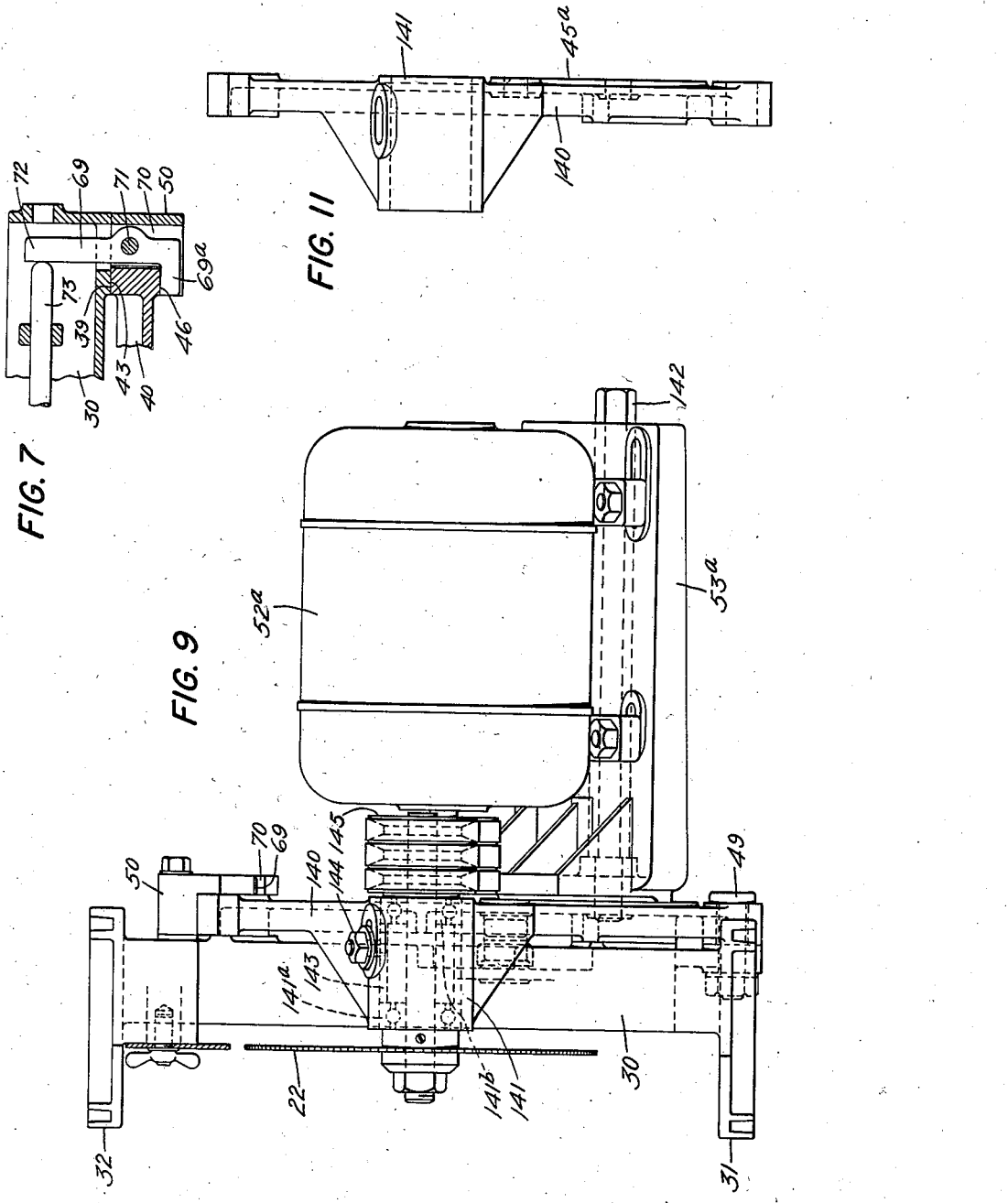

Patented Nov. 4, 1941

2,261,696

UNITED STATES PATENT OFFICE 2,261,696

TILTING SAW

William Ferdinand Ocenasek, Plainfield, N. J., assignor to Walker-Turner Co. Inc., Plainfield, N. J., a corporation of New York Application March 15, 1939, Serial No. 261,883

4 Claims. (Cl. 143—36)

The present invention relates to motor driven tilting arbor saws and concerns more particularly improvements in adjustable saw tables of the character disclosed in my prior Patent No. 2,131,492.

A primary object of the invention is to overcome the difficulties and disadvantages found in the prior types of tilting arbor saws and to render available a simplified structure which embodies all of the essential movements and adjustable characteristics of machines of this type, and which incorporates a greater degree of strength and rigidity accompanied by ease of manipulation, than has heretofore been attained.

A further objective of the invention is to minimize the difficulties in the manufacture of saw machines of this character by rendering available a structure incorporating the fewest number of parts, each designed as to necessitate relatively few and simple machining operations, to the end that a tilting arbor saw embodying a superior degree of rigidity may be constructed at a minimum of expense.

A further aim of the invention is to guard against accidental springing or distorting of the parts and consequent destruction of saw alignment, by unintentional or accidental attempts to overadjust or to move the saw beyond its normal extremes of movement in either direction.

By way of additional improvement the invention aims to protect the relatively movable parts of the adjusting and driving mechanisms from flying saw dust and chips which, in the prior types of saw tables, have a tendency to collect upon and adhere to the movable parts and severely impair their operation and freedom of movement.

Still a further object of the invention is to provide a tilting arbor table saw inherently adaptable to meet the demands of various users insofar as their needs concerns the capacity of the saw, power of the motor, type of drive, and style of the machine standard or base.

In carrying forward the aims of the invention it is proposed to construct the several elements of the machine along the simplest of lines, involving for the most part, plain flat surfaces that may readily be machined and matched to provide relatively large bearing surfaces that are self-cleaning during their normal operating functions.

Inasmuch as the various guideways and guides of a saw table top must be aligned at all times properly with the plane of the saw, it is proposed to support the entire saw adjusting and driving mechanism from the table. To that end a U-shaped tilting saddle is provided having arcuate trunnions at its ends which cooperate with complemental arcuate bearings suspended from the underside of the table top. The axis of swing of the saddle is arranged to lie substantially in the plane of the top surface of the table and line of cut of the saw, and has its major portion offset laterally entirely to one side of the plane of the saw. That side of the tilting saddle away from the saw is finished substantially in a single plane and has detachably pivoted thereto a saw raising and lowering slide which likewise is constructed to lie substantially in a single plane. The free end of the elevating slide extends well beyond the axis of the saw and is provided with marginal bearing surfaces that are cooperatively related to complemental bearing and supporting surfaces and a clamping mechanism provided by the tilting saddle. The slide, in turn, supports the entire driving transmission at the region intermediate its pivot and marginal bearing surfaces and constitutes an interchangeable unitary driving assembly removable bodily from the saddle for replacement or repair.

The raising and lowering of the saw is effected by adjusting the slide on the supporting saddle on their opposed flat surfaces and is effected by a saddle encased manually operated worm and worm gear mechanism and a crank. The crank is detachably connected to the other member by a short connecting rod and the ratio of movement is such that the position of the crank at its maximum throw affects the maximum adjustment of the saw relative to the table, for maximum or zero depth of cut. The mechanism is so arranged that operation of the manual means toward movement of the saw beyond the normal limits, automatically effects movement of the saw in the opposite direction. In this way the danger of effecting an overadjustment and consequently placing undue stresses on the mechanism and throwing the several elements out of alignment, is definitely eliminated. By reason of the coplaner construction and the mounting of the tilting saddle and interchangeable slides, the parts are mutually supported on relatively large bearing surfaces, which are self-cleaning as they wipe across one another in adjusting for depth of cut, and as the elevating slide is firmly supported and guided at both sides of the axis of the saw and substantially clamped directly to the saddle, there is afforded an exceptionally simple yet sturdy and vibration free construction of tilting arbor saw.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 2 is a side view (partly in section) of the machine illustrated in Fig. 1.

Fig. 3 is a detail view of the tilting saddle and portions of the elevating mechanism detached from the machine.

Fig. 4 is a plan view of the tilting saddle.

Figs. 5 and 6 are respectively side and plan views of the elevating slide.

Fig. 7 is a sectional view through lines 7—7 of Fig. 2, illustrating a form of clamping mechanism for clamping the elevating slide to its support.

Figs. 8 and 9 are partial assembly views illustrating a replaceable adjustable mounting for a multiple V-belt drive.

Figs. 10 and 11 are respectively side and plan views of the elevating slide for the belt drive arrangement disclosed in Fig. 8.

Figure 1:
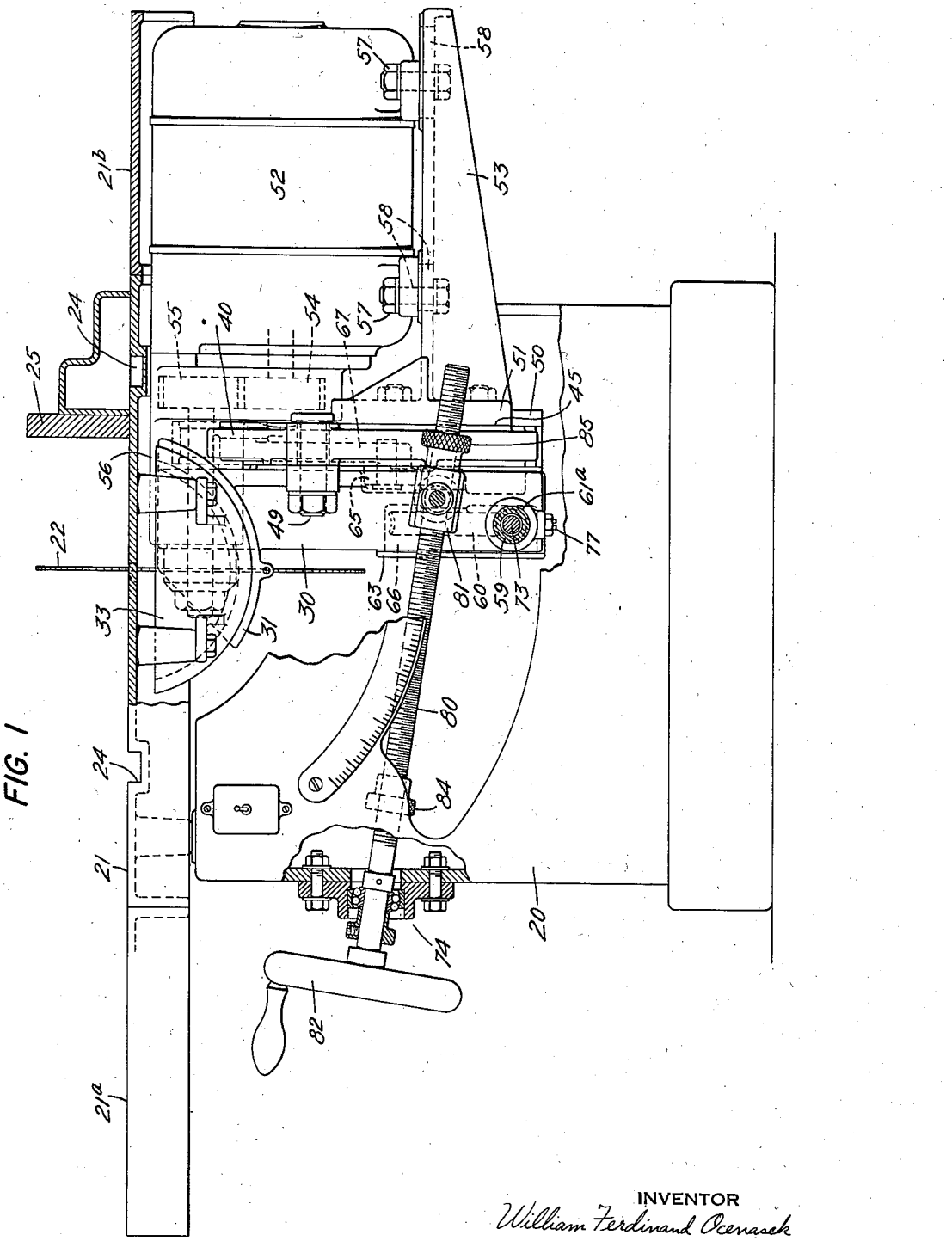
Figure 1 is a front view of a power saw (partly in section) embodying the present invention.

Referring more particularly to Figs. 1 and 2 of the drawings, a pedestal 20 which may be the bench type or the floor type, provides the main support and housing for the saw mechanisms and has mounted thereon a table 21 upon which the workpiece rests as it is moved past the saw 22. Table extensions 21a and 21b may be provided, if desired, to increase the area of the working surface of the table. The table is provided with the usual transverse guides 23, 24 for mounting and guiding the conventional ripping fence 25 and crosscut and mitering gauge (not shown). The saw 22 is adapted to project through a slot defined by a removable insert 26 on the table top, and normally is covered by a combined guard and splitter mechanism 27, 28, 29, which is detachably supported upon the saddle 30 underlying the table top.

The saddle 30, as illustrated more clearly in Fig. 3, comprises a generally U-shaped bracket member and is provided with arcuate trunnion bearings 31, 32 at its upper end which interfit with complemental arcuate trunnions 33, 34 adjustably secured to the underside of the table top. As shown in these figures, the trunnion mountings are slightly tapered and by adjusting the table trunnions 33 and 34 toward each other, a working fit, free from looseness and consequent vibration, is obtained when the parts are initially assembled, and subsequently thereto, in the event adjustment is necessary to compensate for wear on the arcuate bearing surfaces.

The major portion 35 of the bracket depends from the trunnions 31, 32 and is laterally offset from the axis of tilt so as to lie entirely to one side of the tilting axis and the plane of the saw. The side of the bracket 36 away from the saw is substantially flat and is provided with three machined surfaces 37, 38, 39, which lie substantially in a single plane.

An elevating slide 40, which may be of alternative construction to suit various needs and requirements as will hereinafter be explained, is adapted to be detachably supported upon the flat bearing surfaces 37, 38, 39 of the tilting saddle. The elevating plate 40 extends substantially in a single plane and has its inner surface provided with complemental bearing surfaces 41, 42 and 43 and its outer surface machined to afford bearing surfaces 44, 45, and 46. The front end of the tilting bracket and elevating plate is bored and reamed as at 47 and 48 to receive a pivot pin 49 by means of which the parts are bolted together. When so related the arcuate bearing surfaces 38 and 42 match each other, and likewise, the arcuate surfaces 39 and 43, and relative angular movement about the pivot pin 49 may be effected on those bearing surfaces.

To insure rigidity in the mounting in all positions of elevation of the plate 40, the outer end thereof is firmly guided and supported at both sides by a supplemental strap 50 which overlies the arcuate bearing surface 46 of the elevating plate and preferably, is removably attached to the bearing surface 39 of the tilting bracket. In assembling the elevating plate to the tilting bracket, the guide 50 is accurately fitted to the surfaces 39 and 46 so that the plate may freely swing in its own plane in the U-shaped channel thereby provided, without any side or lateral looseness such as would cause chattering or vibration in the assembled machine.

Intermediate the extreme ends of the elevating plate, a motor bracket 51 is bolted to the surface 45 and supports a drive motor 52 on its shelf-like extension 53. In this specific embodiment of the invention the drive to the saw is through gears 54 and 55 journaled in a housing 56 supported directly upon the motor and by adjusting the motor 52 upon the shelf 53, by means of bolts 57 and the transversely arranged slots 58, the saw and its drive may be adjusted as a unitary assembly laterally, or angularly about a vertical axis, to position the plane of the saw precisely where desired with respect to the guides on the table.

A preferred form of means for regulating the depth of cut of the saw is illustrated in connection with Figs. 2 and 3, and comprises essentially a worm and worm wheel mechanism 59 and 60 journaled in the tilting bracket 30 and manually operable from the front of the machine by means of a hand wheel 61. The worm and worm wheel mechanisms are encased in a cavity 62 formed in the tilting bracket, and covered by a plate 63 whereby dust, chips or other foreign matter is definitely excluded. The worm wheel shaft 64 projects through its bearing in the bracket 30 and carries at its outer end a crank 65 which is adapted to revolve in the recess 66 formed within the general plane of the bracket. A short connecting rod 67 detachably connects the crank 65 to the elevating plate 40 at a point 68 located close to its center of mass. Manual turning of the hand wheel 61 will, therefore, through the mechanism just described, effect a raising and lowering of the saw in respect to the table top whereby the depth of cut may be controlled.

An important feature of the saw elevating mechanism described is its inherent ability to protect the mechanism against over-adjustment and/or against the straining of any part of the mechanism out of its true alignment. This result has been achieved by constructing a crank 65 with a lever arm such that its total throw will effect a shifting of the elevating plate through a predetermined maximum range, with due regard being given to the space requirements of the drive assembly to be mounted thereon.

The maximum position of elevation is indicated in Figs. 1 and 3 of the drawings, in which case the crank and its connecting rod assume a straight line position and it is impossible, therefore, to elevate the plate or the saw carried thereby any distance beyond that position. Consequently, inadvertent or accidental continued turning of the hand wheel 61, occasions no damage to the elevating mechanism or places any strain upon the tilting bracket, elevating plate, or drive assembly. With this safety feature the only action the operator may produce, by such continued turning of the hand wheel, is to lower the saw after it has once reached its normal maximum position.

When the operator has adjusted the saw to its proper height, the two essential elements 30 and 40 of the elevating mechanism are clamped directly to each other. For that purpose an L-shaped clamp lever 69 is fitted into a slot 70 formed in the outer guide 50 for the elevating plate and has its toe portion 69a positioned in overlying relation with the arcuate bearing surface 46. See Fig. 7. The clamp lever is pivoted at 71 and has its free end 72 in a position to be engaged by a push rod 73 axially slidable in the tilting bracket 30. The push rod 73 is in axial alignment with the manually operated worm shaft 61a which in this instance is made tubular. An extension of the push rod 73 passes through the worm operating shaft and is provided with a handle 75 at its forward end. The forward end of the shaft 73 is threaded at 76 to the bore of the tube 61a and by revolving the small handle 75 relative to the tube, the push rod 73 is shifted axially, thereby to cause the clamp 69 to impinge upon the surface 46 of the elevating plate thus clamping the surfaces 43 and 39 of the saddle and slide firmly together. Operation of the handle 75 in the reverse direction relieves the pressure on the push rod 73 and the clamp 69 releases.

The elevating worm shaft is restrained against shifting during the operation of raising or lowering the saw and during the clamping and unclamping operations by means of a set screw 77 which operates against a shoe 78 fitted to an annular groove 79 in the shaft 61a.

By the herein proposed method of clamping, the elevating plate 40, which carries the entire weight of the drive assembly and receives the load and impacts of the cutting operation, is clamped firmly to the tilting bracket and the actuating mechanism, namely the worm and worm wheel mechanism 59 and 60, and the crank and connecting rod mechanism 65 and 67, are thereby relieved of all supporting duty when the parts are clamped. Consequently, any slight looseness or play which may, in time, develop in the gear teeth and pivotal connections of the actuating mechanism has no effect upon the rigidity of the mounting of the saw and its driver.

The saw tilting mechanism for a machine of this character comprises a hand screw 80 that is rotatively and pivotally supported at one end in a self-aligning bearing 74 secured to a stationary part of the machine. The screw passes through a nut 81 pivotally mounted to the tilting bracket 30, and by operating the hand wheel 82, the nut 81 is caused to traverse along the shaft 80 and a tilting of the saw is effected. A clamp screw 83 is provided for clamping the nut 81 to the shaft when the saw has been tilted to the desired degree of incline. Normally fixed stops 84 and 85 are provided on the shaft 80 for limiting the extremes of movement so that the operator cannot force the bracket to a point beyond that which everything carried thereby clears.

The foregoing explanation of the invention concerns more particularly the form adapted for the direct drive type of power plant. Should it be desired, however, to convert the machine to the belt driven type of power plant, the alternative form of elevating slide illustrated in Figs. 8–11 may be substituted. The change-over is readily made by removing the elevating plate 40 from the tilting bracket and applying thereto, in its stead, the modified form of elevating plate 140, illustrated in Figs. 9 and 10. The elevating plate for the belt drive provides a journal bearing 141 for the saw arbor, and is otherwise substantially identical with the elevating plate 40 for the direct drive, previously described, so as to be interchangeable therewith.

The lower portion of the elevating plate 140 is formed with a large pad 45a adapted to seat an angularly adjustable motor supporting shelf 53a. A motor 52a is mounted upon the shelf, in tilted position, for compactness and to afford the necessary distance between its pulley axis and the arbor pulley axis for an efficient multiple belt drive. The motor shelf is clamped to the elevating bracket at its axis of rotation by means of a shouldered clamp stud 142 which extends to the outer end of the shelf for convenient operation.

In this alternate form of drive the journal bearings 141a and 141b for the saw arbor are preferably mounted in the bearing 141 and spaced apart by a sleeve 143 which may be adjusted axially in the bearing, for the purpose of positioning the saw where required in its slot, and clamped in adjusted position by clamp means 144. In this construction a relatively long and substantial bearing is provided for the saw arbor, and as the pulleys 145 thereon are located a substantial distance away from the plane of the saw and on the opposite side of the tilting bracket and elevating slide, there is little or no danger of chips incident to the sawing operation being carried to those regions where they may foul the belt driving arrangement.

In this construction, as with the direct drive form previously explained, the elevating mechanism connects at a point 68a and the same protection against over-adjustment or an attempt to over-adjust is afforded. Likewise, the clamping means 69 and its actuating mechanism operate upon the elevating plate 140 in the same manner as in the direct drive design and effects the firm and rigid clamping of the two major supporting elements, independently of the elevating mechanism per se. In both forms, the elevating plate seats upon relatively large bearing areas affording solidity in the mounting, and as the parts are shifted relative to each other, each wipes the surface of the other clean of dust or other foreign matter that may settle thereon.

It will be seen that a machine constructed in accordance with this invention embodies a degree of versatility heretofore unapproached in prior structures. The base structural elements may be produced as standard units adaptable for either type of power plant and by assembling thereon an elevating plate selected in accordance with the type of drive desired, a direct driven machine or a belt driven machine may be produced at will. By reason of accessibility to the motor that the present invention affords, the motor may readily be changed or replaced for one of greater or lesser capacity to suit the needs and demands of any given user, and as the main supporting, elevating, and driving means are entirely to one side of the plane of the saw, there are no substantial limitations as to the size or kind of saw that may be used.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A circular saw machine combining a standard member, a table member mounted on the standard and having a slot therein through which the saw operates; a bracket member pivotally mounted to and under said table and whose major portion is laterally offset and parallel aligned with the said saw slot, said bracket member being mounted to tilt relative to the table about an axis lying in the plane of the table top and being relatively thin and wide and positioned normally edgewise to the plane of the table, said bracket also extending beyond both ends of the said saw slot and having a transversely extending elongated aperture provided therein intermediate its ends to receive therethrough the saw mandrel; front and rear flat bearing surfaces on the side of said bracket remote from the saw slot, said flat bearing surfaces being positioned at opposite sides of the mandrel opening therein; a substantially flat elevating plate having complementary spaced bearing surfaces cooperatively engaging the flat bearing surfaces on said tilting bracket; means for pivotally securing one end of said flat plate in bearing relation with the front bearing surfaces on said tilting bracket; guide means provided by the tilting bracket and extending around the free end of the flat plate for supporting and guiding the said free end of the elevating plate in bearing relation with the said rear bearing surfaces on said bracket; a rotatable saw mandrel carried on and supported by said flat elevating plate on an axis perpendicular to the plane thereof, in a position intermediate its pivoted and guided ends, said mandrel having an extended portion thereof projecting transversely across the plane of the plate through the said elongated opening in the tilting bracket member for mounting a saw on the other side of the tilting bracket in an operating position with respect to the saw slot in the table; manually operable means carried by and tiltable with said tilting bracket for shifting said plate about its pivot and on said flat bearing surfaces thereby to raise or lower the saw mandrel carried thereby relative to the table top; and means for moving the bracket and parts carried thereby relative to the table about said tilting axis.

2. The combination set forth in claim 1 in which manually operable means in addition to the said manual elevating means are provided for clamping the free end of the pivoted plate face-to-face firmly to the bracket in any adjusted position, said clamp means comprising a clamp element carried by the tilting bracket in a position adjacent the free end of the elevating plate and adapted when actuated in a clamping direction to engage the outer surface of the elevating plate at the free end thereof and to urge the free end of said plate tightly against the rear bearing surfaces on said bracket, and means extending from said clamp element to the front of the machine in a position accessible to the operator in all tilted positions of said tilting bracket for actuating the said clamp element.

3. A circular saw machine combining a standard, a table member mounted thereon, said table having a slot therein through which a saw may be raised and lowered for depth of cut; a saw tilting bracket pivotally mounted under the table; a saw elevating plate member pivotally supported upon said tiltable bracket; a saw and saw driving means mounted on said plate member; elevating means for said saw comprising a worm and worm wheel mechanism journaled in said tilting bracket in a covered recess provided therein at one side of the plane of movement of said plate, a shaft element extending through said bracket and connected to be driven by said wheel, said shaft having a crank pin element at its end positioned to rotate in a recess provided therein, said crank pin being capable of being rotated through 360°; means connecting said crank pin to said pivoted plate member at a point to one side of and at a distance from its pivotal axis, said crank pin having a total throw arranged to move the saw in an arcuate path from a safe zero depth cutting position relative to the table to a safe maximum depth cutting position and on a complete revolution of said crank pin to move the saw from one of said positions to the other and back again without interference and without reversing the direction of crank pin motion.

4. An adjustable circular saw machine combining a table member having a slot therein through which the saw operates; a saddle member underlying the table for supporting a saw and drive assembly, said saddle member comprising a relatively long and narrow member positioned parallel to and laterally offset from the vertical plane of the saw slot and having the outer surface remote from said slot machined substantially flat and in a single plane forming flat bearing surfaces coplaner with the operating plane of the saw; an elevating plate member movably mounted on said machined side of the saddle, said plate being substantially coextensive in area to said machined side of the saddle and positioned face-to-face therewith; a saw mandrel and driving assembly mounted to said plate, said mandrel being mounted to rotate on an axis perpendicular to the plane of said plate and having a portion extending across the plate and saddle members to a position adjacent the saw slot in the table for mounting a saw thereon; means for securing one end of said elevating plate in supporting and bearing relation with the bearing surfaces on the saddle at one side of the saw mandrel axis; additional means for supporting and guiding said plate in bearing relation with the bearing surfaces on the saddle at the other side of the axis of the saw mandrel; means for adjusting the elevating plate on said flat bearing surfaces toward or away from the table thereby to effect a raising or lowering of the saw; and means for clamping said elevating plate face-to-face to said saddle in adjusted position comprising an L-shaped member pivotally mounted in the saddle with the hooked end thereof extending around and overlying the outer surface of the elevating plate, and means for rocking said member about its pivot to effect said face-to-face clamping action.

WILLIAM FERDINAND OCENASEK.